US009330060B1

(12) United States Patent
Tsang (10) Patent No.: US 9,330,060 B1
(45) Date of Patent: May 3, 2016

(54) METHOD AND DEVICE FOR ENCODING AND DECODING VIDEO IMAGE DATA

(75) Inventor: Eric Kwong-Hang Tsang, Milpitas, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 917 days.

(21) Appl. No.: 10/826,798

(22) Filed: Apr. 15, 2004

Related U.S. Application Data (60) Provisional application No. 60/463,017, filed on Apr. 15, 2003.

(51) Int. Cl.
| | |
|---|---|
| G06F 15/82 | (2006.01) |
| H04N 19/43 | (2014.01) |
| H04N 19/436 | (2014.01) |
| H04N 19/42 | (2014.01) |

(52) U.S. Cl.
CPC .............. *G06F 15/82* (2013.01); *H04N 19/43* (2014.11); *H04N 19/436* (2014.11); *H04N 19/439* (2014.11)

(58) Field of Classification Search
CPC ..................................................... G06F 15/82
USPC ............ 375/240, 240.01, 240.25; 712/10, 11, 712/18, 25
See application file for complete search history.

(56) References Cited

U.S. PATENT DOCUMENTS

| | | | |
|---|---|---|---|
| 3,679,821 A | 7/1972 | Schroeder | |
| 3,794,984 A * | 2/1974 | Deerfield et al. | 712/11 |
| 4,177,514 A * | 12/1979 | Rupp | 712/18 |
| 4,583,164 A * | 4/1986 | Tolle | 712/11 |
| 4,591,979 A * | 5/1986 | Iwashita | 712/25 |
| 4,644,461 A * | 2/1987 | Jennings | 718/106 |
| 4,745,544 A * | 5/1988 | Renner et al. | 712/11 |
| 4,755,810 A | 7/1988 | Knierim | |
| 4,814,978 A * | 3/1989 | Dennis | 712/201 |
| 4,843,540 A * | 6/1989 | Stolfo | 712/11 |
| 4,992,857 A | 2/1991 | Williams | |
| 5,045,940 A * | 9/1991 | Peters et al. | 348/472 |
| 5,130,797 A * | 7/1992 | Murakami et al. | 375/240.16 |

(Continued)

FOREIGN PATENT DOCUMENTS

| | | |
|---|---|---|
| CN | 1489391 | 4/2004 |
| EP | 1283640 A2 | 2/2003 |

(Continued)

OTHER PUBLICATIONS

_The Merriam-Webster Dictionary_. 2005 ed. Springfield, MA: Merriam-Webster Inc., 2005.*

(Continued)

*Primary Examiner* — David N Werner (57) ABSTRACT

A method and device for encoding and decoding video image data. An MPEG decoding and encoding process using data flow pipeline architecture implemented using complete dedicated logic is provided. A plurality of fixed-function data processors are interconnected with at least one pipelined data transmission line. At least one of the fixed-function processors performs a predefined encoding/decoding function upon receiving a set of predefined data from said transmission line. Stages of pipeline are synchronized on data without requiring a central traffic controller. This architecture provides better performance in smaller size, lower power consumption and better usage of memory bandwidth.

24 Claims, 5 Drawing Sheets

(56) References Cited

U.S. PATENT DOCUMENTS

| | | | |
|---|---|---|---|
| 5,146,324 A * | 9/1992 | Miller et al. | 375/240.03 |
| 5,212,742 A | 5/1993 | Normile et al. | |
| 5,224,213 A * | 6/1993 | Dieffenderfer | G06F 5/16 |
| | | | 710/53 |
| 5,225,875 A | 7/1993 | Shapiro et al. | |
| 5,233,689 A | 8/1993 | Rhoden et al. | |
| 5,267,334 A | 11/1993 | Normille et al. | |
| 5,267,344 A | 11/1993 | Nelson, III | |
| 5,369,744 A | 11/1994 | Fukushima et al. | |
| 5,371,896 A | 12/1994 | Gove et al. | |
| 5,448,745 A * | 9/1995 | Okamoto | 712/25 |
| 5,586,281 A * | 12/1996 | Miyama et al. | 711/5 |
| 5,596,369 A * | 1/1997 | Chau | 375/240.15 |
| 5,598,514 A | 1/1997 | Purcell et al. | |
| 5,608,652 A | 3/1997 | Astle | |
| 5,613,146 A * | 3/1997 | Gove et al. | 712/20 |
| 5,623,311 A * | 4/1997 | Phillips et al. | 375/240.25 |
| 5,630,033 A | 5/1997 | Purcell et al. | |
| 5,646,692 A | 7/1997 | Bruls | |
| 5,657,465 A * | 8/1997 | Davidson et al. | 712/201 |
| 5,682,491 A * | 10/1997 | Pechanek et al. | 712/209 |
| 5,768,429 A | 6/1998 | Jabbi et al. | 382/233 |
| 5,790,881 A | 8/1998 | Nguyen | |
| 5,809,538 A | 9/1998 | Pollmann et al. | |
| 5,821,886 A | 10/1998 | Son | |
| 5,845,083 A | 12/1998 | Hamadani et al. | |
| 5,870,310 A * | 2/1999 | Malladi | 716/19 |
| 5,883,823 A | 3/1999 | Ding | |
| 5,889,949 A | 3/1999 | Charles | |
| 5,898,881 A * | 4/1999 | Miura et al. | 712/16 |
| 5,909,224 A | 6/1999 | Fung | |
| 5,923,375 A * | 7/1999 | Pau | 375/240.01 |
| 5,926,643 A * | 7/1999 | Miura | 712/7 |
| 5,954,786 A | 9/1999 | Volkonsky | |
| 5,969,728 A | 10/1999 | Dye et al. | |
| 5,999,220 A | 12/1999 | Washino | |
| 6,035,349 A | 3/2000 | Ha et al. | |
| 6,049,818 A * | 4/2000 | Leijten et al. | 718/107 |
| 6,073,185 A * | 6/2000 | Meeker | 710/1 |
| 6,088,355 A | 7/2000 | Mills et al. | |
| 6,098,174 A | 8/2000 | Baron et al. | |
| 6,144,362 A | 11/2000 | Kawai | |
| 6,145,073 A * | 11/2000 | Cismas | 712/25 |
| 6,148,109 A | 11/2000 | Boon et al. | |
| 6,157,751 A | 12/2000 | Olson et al. | |
| 6,175,594 B1 | 1/2001 | Strasser et al. | |
| 6,188,799 B1 | 2/2001 | Tan et al. | |
| 6,195,389 B1 | 2/2001 | Rodriguez et al. | |
| 6,222,883 B1 | 4/2001 | Murdock et al. | |
| 6,269,174 B1 | 7/2001 | Koba et al. | |
| 6,272,281 B1 | 8/2001 | De Vos et al. | |
| 6,305,021 B1 | 10/2001 | Kim | |
| 6,311,204 B1 | 10/2001 | Mills | |
| 6,317,124 B2 | 11/2001 | Reynolds | |
| 6,356,945 B1 * | 3/2002 | Shaw et al. | 709/231 |
| 6,360,234 B2 | 3/2002 | Jain et al. | |
| 6,418,166 B1 | 7/2002 | Wu et al. | |
| 6,459,738 B1 * | 10/2002 | Wu et al. | 375/240.27 |
| 6,526,500 B1 * | 2/2003 | Yumoto et al. | 712/25 |
| 6,539,060 B1 | 3/2003 | Lee et al. | |
| 6,539,120 B1 | 3/2003 | Sita et al. | |
| 6,560,629 B1 * | 5/2003 | Harris | 718/105 |
| 6,570,579 B1 * | 5/2003 | MacInnis | G06T 9/00 |
| | | | 345/501 |
| 6,647,062 B2 | 11/2003 | Mackinnon | |
| 6,665,346 B1 | 12/2003 | Lee et al. | |
| 6,687,788 B2 * | 2/2004 | Vorbach et al. | 711/122 |
| 6,690,835 B1 | 2/2004 | Brockmeyer et al. | |
| 6,690,836 B2 | 2/2004 | Natarajan et al. | |
| 6,708,246 B1 | 3/2004 | Ishihara et al. | |
| 6,721,830 B2 * | 4/2004 | Vorbach et al. | 710/100 |
| 6,751,721 B1 * | 6/2004 | Webb et al. | 712/10 |
| 6,760,478 B1 | 7/2004 | Adiletta et al. | |
| 6,782,052 B2 | 8/2004 | Sun et al. | |
| 6,799,192 B1 | 9/2004 | Handley | |
| 6,807,317 B2 | 10/2004 | Mathew et al. | |
| 6,823,443 B2 * | 11/2004 | Horiyama et al. | 712/201 |
| 6,950,473 B2 | 9/2005 | Kim et al. | |
| 6,993,639 B2 * | 1/2006 | Schlansker et al. | 712/18 |
| 6,996,645 B1 * | 2/2006 | Wiedenman et al. | 710/107 |
| 7,038,687 B2 | 5/2006 | Booth, Jr. et al. | |
| 7,095,783 B1 * | 8/2006 | Sotheran et al. | 375/240.01 |
| 7,173,631 B2 | 2/2007 | Anderson | |
| 7,181,594 B2 * | 2/2007 | Wilkinson et al. | 712/11 |
| 7,215,823 B2 | 5/2007 | Miura et al. | |
| 7,260,148 B2 | 8/2007 | Sohm | |
| 7,277,101 B2 | 10/2007 | Zeng | |
| 7,289,672 B2 | 10/2007 | Sun et al. | |
| 7,379,501 B2 | 5/2008 | Lainema | |
| 7,394,284 B2 * | 7/2008 | Vorbach | 326/38 |
| 7,403,564 B2 * | 7/2008 | Laksono | 375/240.16 |
| 7,450,640 B2 | 11/2008 | Kim et al. | |
| 7,499,491 B2 | 3/2009 | Lee et al. | |
| 7,548,586 B1 | 6/2009 | Mimar | |
| 7,548,596 B2 | 6/2009 | Yen et al. | |
| 7,551,671 B2 | 6/2009 | Tyldesley et al. | |
| 7,565,077 B2 | 7/2009 | Rai et al. | |
| 7,581,076 B2 * | 8/2009 | Vorbach | 711/202 |
| 7,581,182 B1 | 8/2009 | Herz | |
| 7,630,097 B2 | 12/2009 | Kodama et al. | |
| 7,689,000 B2 | 3/2010 | Kazama | |
| 7,693,219 B2 | 4/2010 | Yan | |
| 7,720,311 B1 | 5/2010 | Sriram | |
| 7,721,069 B2 | 5/2010 | Ramchandran et al. | |
| 7,792,194 B2 | 9/2010 | Zhong et al. | |
| 7,924,923 B2 | 4/2011 | Lee et al. | |
| 7,996,827 B2 * | 8/2011 | Vorbach et al. | 717/149 |
| 8,009,923 B2 | 8/2011 | Li et al. | |
| 8,369,402 B2 | 2/2013 | Kobayashi et al. | |
| 8,442,334 B2 | 5/2013 | Drugeon et al. | |
| 8,660,182 B2 | 2/2014 | Zhong et al. | |
| 8,660,380 B2 | 2/2014 | Bulusu et al. | |
| 8,666,166 B2 | 3/2014 | Bulusu et al. | |
| 8,666,181 B2 | 3/2014 | Venkatapuram et al. | |
| 8,724,702 B1 | 5/2014 | Bulusu et al. | |
| 8,731,071 B1 | 5/2014 | Kimura | |
| 8,756,482 B2 | 6/2014 | Goel | |
| 8,873,625 B2 | 10/2014 | Goel | |
| 2001/0020941 A1 | 9/2001 | Reynolds | |
| 2001/0024448 A1 * | 9/2001 | Takase et al. | 370/428 |
| 2001/0028353 A1 | 10/2001 | Cheng | |
| 2001/0028354 A1 | 10/2001 | Cheng et al. | |
| 2002/0015445 A1 * | 2/2002 | Hashimoto | 375/240.02 |
| 2002/0015513 A1 | 2/2002 | Ando et al. | |
| 2002/0025001 A1 | 2/2002 | Ismaeil et al. | |
| 2002/0041626 A1 * | 4/2002 | Yoshioka et al. | 375/240 |
| 2002/0109790 A1 | 8/2002 | Mackinnon | |
| 2002/0114394 A1 | 8/2002 | Ma | |
| 2002/0118743 A1 * | 8/2002 | Jiang | 375/240.01 |
| 2003/0020835 A1 | 1/2003 | Petrescu | |
| 2003/0048361 A1 | 3/2003 | Safai | |
| 2003/0078952 A1 | 4/2003 | Kim et al. | |
| 2003/0141434 A1 * | 7/2003 | Ishikawa et al. | 250/208.1 |
| 2003/0161400 A1 | 8/2003 | Dinerstein et al. | |
| 2004/0056864 A1 * | 3/2004 | Valmiki | G06T 9/007 |
| | | | 345/531 |
| 2004/0057523 A1 | 3/2004 | Koto et al. | |
| 2004/0095998 A1 | 5/2004 | Luo et al. | |
| 2004/0100466 A1 | 5/2004 | Deering | |
| 2004/0150841 A1 | 8/2004 | Lieberman et al. | |
| 2004/0156435 A1 | 8/2004 | Itoh et al. | |
| 2004/0174998 A1 | 9/2004 | Youatt et al. | |
| 2004/0181564 A1 | 9/2004 | MacInnis et al. | |
| 2004/0181800 A1 | 9/2004 | Rakib et al. | |
| 2004/0190613 A1 | 9/2004 | Zhu et al. | |
| 2004/0190617 A1 | 9/2004 | Shen et al. | |
| 2004/0202245 A1 | 10/2004 | Murakami et al. | |
| 2004/0213348 A1 | 10/2004 | Kim et al. | |
| 2004/0218626 A1 | 11/2004 | Tyldesley et al. | |
| 2004/0218675 A1 | 11/2004 | Kim et al. | |
| 2004/0228415 A1 | 11/2004 | Wang | |
| 2004/0257434 A1 | 12/2004 | Davis et al. | |
| 2004/0268088 A1 * | 12/2004 | Lippincott et al. | 712/25 |
| 2005/0008254 A1 | 1/2005 | Ouchi et al. | |

(56) References Cited

U.S. PATENT DOCUMENTS

| | | |
|---|---|---|
| 2005/0033788 A1 | 2/2005 | Handley |
| 2005/0047502 A1 | 3/2005 | McGowan |
| 2005/0066205 A1 | 3/2005 | Holmer |
| 2005/0079914 A1 | 4/2005 | Kaido et al. |
| 2005/0105618 A1 | 5/2005 | Booth et al. |
| 2005/0123040 A1 | 6/2005 | Bjontegard |
| 2005/0190976 A1 | 9/2005 | Todoroki et al. |
| 2005/0238102 A1 | 10/2005 | Lee et al. |
| 2005/0238103 A1 | 10/2005 | Subramaniyan et al. |
| 2005/0265447 A1 | 12/2005 | Park |
| 2005/0265454 A1 | 12/2005 | Muthukrishnan et al. |
| 2005/0276493 A1 | 12/2005 | Xin et al. |
| 2005/0281337 A1 | 12/2005 | Kobayashi et al. |
| 2005/0286630 A1 | 12/2005 | Tong et al. |
| 2006/0002466 A1 | 1/2006 | Park |
| 2006/0017802 A1 | 1/2006 | Yoo et al. |
| 2006/0056513 A1 | 3/2006 | Shen et al. |
| 2006/0056708 A1 | 3/2006 | Shen et al. |
| 2006/0109910 A1 | 5/2006 | Nagarajan |
| 2006/0115001 A1 | 6/2006 | Wang et al. |
| 2006/0133501 A1 | 6/2006 | Lee et al. |
| 2006/0133506 A1 | 6/2006 | Dang |
| 2006/0176299 A1 | 8/2006 | Subbalakshmi et al. |
| 2006/0176962 A1 | 8/2006 | Arimura et al. |
| 2006/0203916 A1 | 9/2006 | Chandramouly et al. |
| 2006/0291563 A1 | 12/2006 | Park et al. |
| 2007/0002945 A1 | 1/2007 | Kim |
| 2007/0002950 A1 | 1/2007 | Yang |
| 2007/0036215 A1 | 2/2007 | Pan et al. |
| 2007/0070080 A1 | 3/2007 | Graham et al. |
| 2007/0133689 A1 | 6/2007 | Park et al. |
| 2007/0171981 A1 | 7/2007 | Qi |
| 2007/0217506 A1 | 9/2007 | Yang et al. |
| 2007/0230564 A1 | 10/2007 | Chen et al. |
| 2007/0274389 A1 | 11/2007 | Kim et al. |
| 2007/0286284 A1 | 12/2007 | Ito et al. |
| 2007/0286508 A1 | 12/2007 | Le Leannec et al. |
| 2008/0069203 A1 | 3/2008 | Karczewicz et al. |
| 2008/0117214 A1 | 5/2008 | Perani et al. |
| 2008/0137726 A1 | 6/2008 | Chatterjee et al. |
| 2008/0151997 A1 | 6/2008 | Oguz |
| 2008/0285444 A1 | 11/2008 | Diab et al. |
| 2008/0291209 A1 | 11/2008 | Sureka et al. |
| 2008/0310509 A1 | 12/2008 | Goel |
| 2009/0060277 A1 | 3/2009 | Zhang et al. |
| 2009/0086827 A1 | 4/2009 | Wu et al. |
| 2009/0116549 A1 | 5/2009 | Shen et al. |
| 2009/0122864 A1 | 5/2009 | Palfner et al. |
| 2009/0161763 A1 | 6/2009 | Rossignol et al. |
| 2009/0196350 A1 | 8/2009 | Xiong |
| 2009/0268974 A1 | 10/2009 | Takagi |
| 2010/0034268 A1 | 2/2010 | Kusakabe et al. |
| 2010/0118943 A1 | 5/2010 | Shiodera et al. |
| 2010/0128797 A1 | 5/2010 | Dey |
| 2013/0170553 A1 | 7/2013 | Chen et al. |
| 2013/0294507 A1 | 11/2013 | Song et al. |
| 2015/0195522 A1 * | 7/2015 | Li ................. H04N 19/12 375/240.03 |

FOREIGN PATENT DOCUMENTS

| | | | |
|---|---|---|---|
| EP | 1283640 A2 | 12/2003 | |
| GB | 2348559 | 4/2000 | |
| GB | 2348559 | 10/2000 | |
| JP | 04162893 | 6/1992 | |
| JP | 11-96138 | 4/1999 | |
| JP | 2001184323 | 7/2001 | |
| JP | 2005192232 | 7/2005 | |
| JP | 2005354686 | 12/2005 | |
| JP | 2006287315 | 10/2006 | |
| WO | WO 9827742 A1 * | 6/1998 | ............... H04N 7/50 |
| WO | 0233650 | 4/2002 | |
| WO | 2005001625 | 1/2005 | |
| WO | 2005096168 | 10/2005 | |
| WO | 2006085137 | 8/2006 | |

OTHER PUBLICATIONS

A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.*

Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on , vol. 2, No., pp. II-273-6 vol. 2, May 23-26, 2004.*

Iwasaki, I.; Naganuma, J.; Nitta, K.; Nakamura, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond HDTV level," Design, Automation and Test in Europe Conference and Exhibition, Mar. 2003.*

Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov. 1997.*

Shih-Hao Wang et al.; "A platform-based MPEG-4 advanced video coding (AVC) decoder with block level pipelining," Information, Communications and Signal Processing, 2003 and the Fourth Pacific Rim Conference on Multimedia. Proceedings of the 2003 Joint Conference of the Fourth International Conference on , vol. 1, No., pp. 51-55 vol. 1, Dec. 2003.*

Tu, C., Liang, J., and Tran, T. "Adaptive Runlength Coding", in _IEEE Signal Processing Letters_ vol. 10, No. 3, pp. 61-64. Mar. 2003.*

National Semiconductor Corp., "USBN9603/4—Increased Data Transfer Rate Using Ping-Pong Buffering," Application Note 1222, Mar. 2002, Revision 1.0, Texas Instruments, Literature No. SNOA417.

Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, XP000439487.

* cited by examiner

METHOD AND DEVICE FOR ENCODING AND DECODING VIDEO IMAGE DATA

RELATED U.S. APPLICATION

This application claims priority to the provisional patent application, Ser. No. 60/463,017, entitled "Data Flow Pipeline Architecture for MPEG Video Codec," with filing date Apr. 15, 2003, and assigned to the assignee of the present application.

FIELD OF THE INVENTION

The present invention relates to the field of digital video image processing. More particularly, embodiments of the present invention relate to methods and devices for encoding and decoding video image data without requiring a separate digital signal processor (DSP) or an embedded processor to perform the main data-stream management.

BACKGROUND OF THE INVENTION

The conventional art of designing and configuring a Motion Pictures Experts Group (MPEG) encoding and decoding system is confronted with several technical limitations and difficulties. Particularly, the task of processing a video image data based on the MPEG video standard involves many complex algorithms and requires several processing stages. Each of these algorithms consists of many computationally intensive tasks, executing all the complex encoding and decoding procedures in real time. For the purpose of generating real time video images, conventional methods of configuring a MPEG system generally require a very high performance solution. A conventional configuration usually requires a digital signal processor (DSP) or embedded processor to handle mainstream processes and may also require additional hardware assist logic circuits.

However, the conventional configurations create several technical challenges and difficulties. Implementation of a conventional configuration first requires the selection of an appropriate high performance DSP platform to support the high processing demand thus causing an increase in the production costs of such system. The processor selected based on this DSP platform then extracts and executes software programs stored in the memory that causes the size and power consumptions to increase and also degrades the processing bandwidth due to the data transfer operations between the memory and processor. The handling and control of data transfer sequencing and synchronization further adds to the overhead of DSP overhead that further slow down the MPEG encode/decode operations.

Even though current digital video encoding and compression techniques are able to take advantage of redundancies inherent in natural imagery to dramatically improve the efficiency in video image data storage and processing and to allow for faster transmission of images, there are still needs to lower the power consumption, to increase the processing speed and to achieve more compact video storage. Particularly, this is a challenging task as the decoding of the MPEG compressed video data involves five basic operations: 1) bit stream parser and variable decoder; 2) inverse scan and run-level code decoder; 3) de-quantization and inverse discrete cosine transform function (IDCT); 4) motion compensation; and 5) YUV to RGB color conversion.

Figure 1:
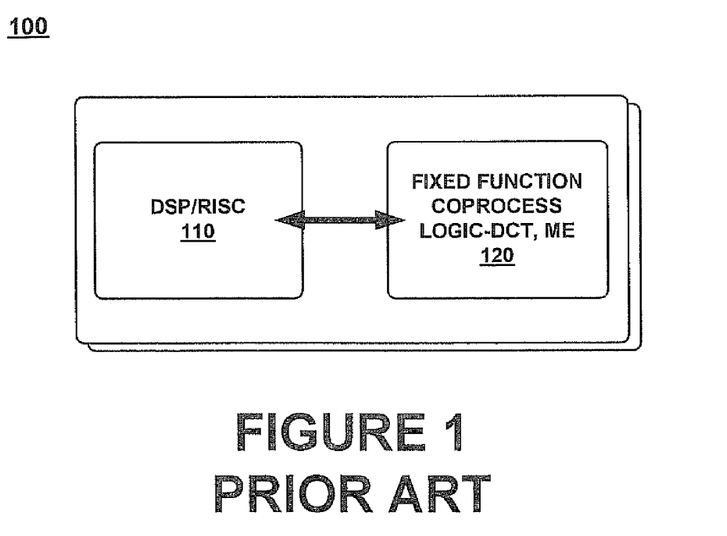
FIG. 1 shows a functional block diagram of a conventional MPEG video image display system, in accordance with the prior art.

For example, FIG. 1 shows a functional block diagram of a conventional MPEG video image display system, in accordance with the prior art. In particular, DSP/RISC 110 controls, manages and co-processes the fixed functions necessary for the image data processing, such as discrete cosine transform function (DCT), motion estimation (ME) and motion compensation), and any components of codec functions. These functions include the five operations described above. A quantitative estimate of the complexity of the general MPEG video real-time decoding process in terms of the number of required instruction cycles per second reveals that, for a typical general-purpose RISC processor, all of the resources of the microprocessor are exhausted by, for example, the color conversion operation alone. Real-time decoding refers to decoding at the rate at which the video signals were originally recorded (e.g., 30 frames per second). An exemplary digital television signal generates about 10.4 million picture elements (pixels) per second. Since each pixel has three independent color components (primary colors: red, green and blue), the total data element rate is more than 30 million per second, which is of the same order of magnitude as current CPU clock speeds. Thus, even at the highest current CPU clock speed of 200 MHz, there are only 20 clock cycles available for processing each pixel, and less than 7 clocks per color component.

Furthermore, to convert the video signals of a digital television signal from YUV format to RGB format in real time, for example, using even the fastest conventional microprocessors requires approximately 200 million instruction cycles per second (nearly all of the data processing bandwidth of such a microprocessor). Depending on the type of processor used and several other factors such as bit rate, average symbol rate, etc., implementing each of the IDCT function and motion compensation in real time may require, for example, anywhere from approximately 90 million operations per second (MOPS) to 200 MOPS for full resolution images. Existing general-purpose microprocessors are extremely inefficient in handling real-time decompression of full-size, digital motion video signals compressed according to MPEG standards. Typically, additional hardware is needed for such real-time decompression, which adds to system complexity and cost.

The requirement for performing these tasks using a processor that involves the execution of software programs increase the costs, power consumption, and size of the system and further degrades the bandwidth and speed of video image data processing. For these reasons, there is a need for a more efficient implementation of real-time decompression of digital motion video compressed according to MPEG standards such that the difficulties and limitations of the conventional techniques can be resolved.

SUMMARY OF THE INVENTION

Various embodiments of the present invention provide a device configuration and method for carrying out video image data encoding/decoding function implemented with pipelined, data-driven functional blocks to eliminate the requirement of using a digital signal processor (DSP) as a central processor to overcome the above-mentioned prior art difficulties and limitations. In one embodiment, the functional blocks may be fixed functions.

In one embodiment, the present invention provides an MPEG-4 video image data encoding/decoding device including fixed-function processors connected in a pipelined configuration. A fixed function processor carries out a predefined encoding/decoding function upon receiving a set of predefined data in a data driven manner such that a central processor is not required. By configuring the fixed function processors in a pipelined architecture, a high degree of parallel processing capability can be achieved. The pipelined functional blocks can be configured such that the functional blocks are highly portable and can be conveniently maintained, are easily scalable and can be implemented in different encoding/decoding devices. As the configuration and operations are significantly simplified, the encoding-decoding device can achieve low power consumption and the functional block that are not used can be powered down in an idle state until it is activated again when data is received. Since each functional block may be a dedicated processor, the memory size can be optimal designed to minimize resource waste arising from the storage of a large amount of data required for performing multiple logic functions.

In one embodiment, the present invention provides a video image data encoding/decoding device including a plurality of fixed-function data processors interconnected with at least one pipelined data transmission line. The fixed-function processors perform predefined encoding/decoding functions upon receiving a set of predefined data from the transmission line. In one embodiment, the plurality of fixed function data processors may include a data buffer queue for receiving a set of predefined data from the transmission line. In another embodiment, the plurality of fixed function data processors may include a control queue for initiating a performance of the predefined encoding/decoding function upon receiving a set of predefined data from the transmission line.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 2:
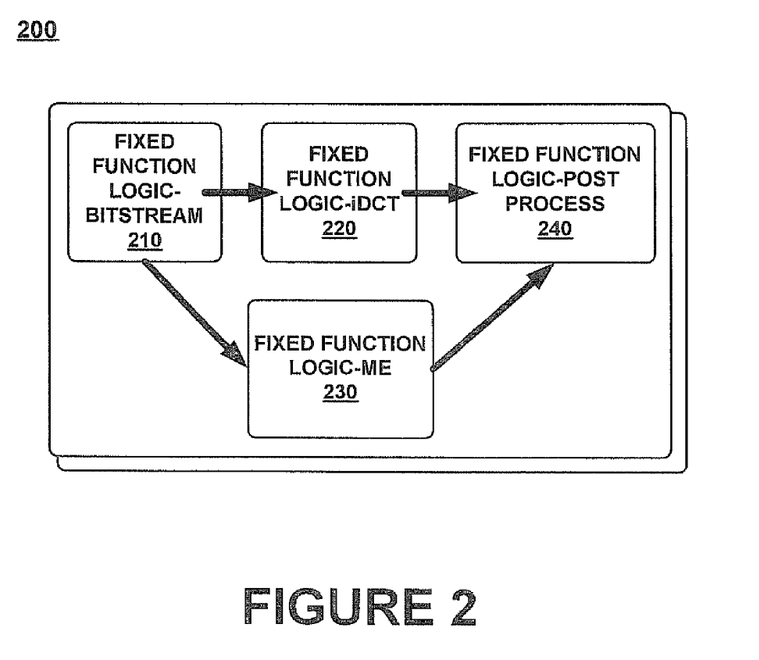
FIG. 2 shows a functional block diagram of a data-driven MPEG encode-decode system, in accordance with an embodiment of the present invention.

FIG. 2 shows an exemplary functional block diagram of a data-driven MPEG encode/decode system 200, in accordance with an embodiment of the present invention. In one embodiment, MPEG encode/decode system 200 is a data-driven pipelined configuration of MPEG-4 decoder architecture. MPEG encode/decode system 200 includes bit stream fixed function logic 210, IDCT fixed function logic 220, motion estimation/compensation fixed function logic 230, and post process fixed function logic 240.

FIG. 2 shows the pipelined data flow where the data transfers from one functional block, e.g., from bit stream fixed function logic 210 to inverse discrete cosine transform (IDCT) fixed function logic 220 and motion estimation/compensation fixed function logic 230 and then to post process fixed function logic 240, are automatically controlled based on a data driven process. The configuration is significantly simplified because there is no need to employ a high performance digital signal processor (DSP) to control and coordinate the overall data flow. Fixed function logic of a data-driven MPEG encode/decode system 200 includes dedicated logic that operates independently of other fixed functions. Fixed function logic carries out a predefined encoding/decoding function upon receiving a set of predefined data in a data driven manner such that a central processor is not required.

It should be appreciated that the dedicated logic processors can also be implemented with higher performance without requiring a high cost implementation because of the simplified configuration that does not require synchronizations and complicated check and branch operations. The speed of carrying out the encoding/decoding function is improved because each of the pipelined functional blocks can each perform the assigned dedicated function simultaneously. These significant benefits are achieved because there are less requirements for wasting the overhead resources arising from the tracking and synchronizations of the data flows among many processors that are required in the encoding/decoding devices implemented with conventional configurations.

Figure 3:
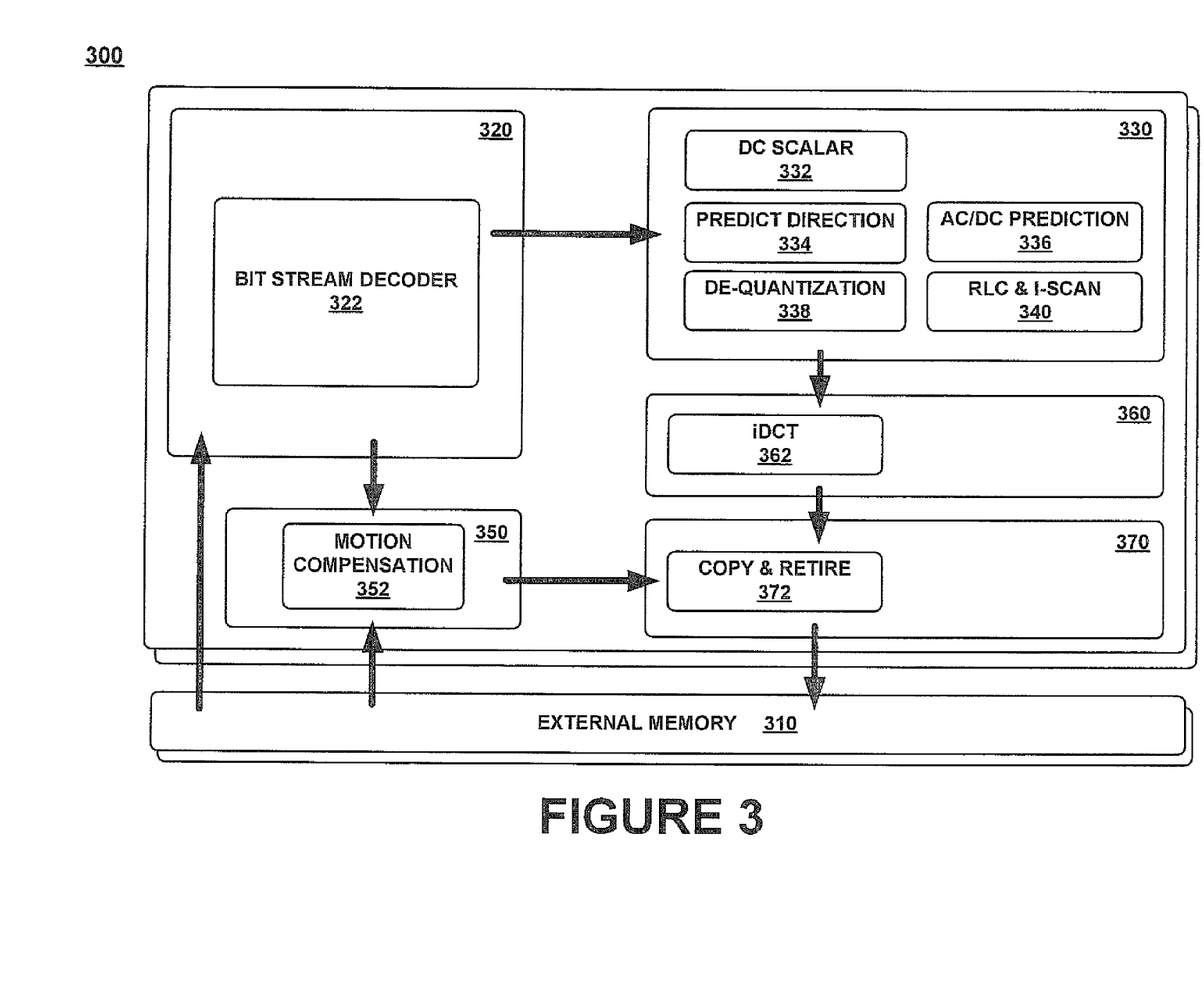
FIG. 3 shows a functional block diagram of a data-driven MPEG decoder architecture, in accordance with an embodiment of the present invention.

FIG. 3 shows a functional block diagram of data-driven MPEG decoder architecture 300, in accordance with an embodiment of the present invention. In one embodiment, data-driven MPEG decoder architecture 300 is operable to decode MPEG-4 video image data. In one embodiment, the pipelined configuration is constructed by employing blocks to carry out a fixed logic that represent a pipeline stage. The smaller functional block inside each larger functional block represents the fixed function (e.g., pipelined stages implemented inside this larger functional block).

The MPEG encoded data is stored in external memory 310. In one embodiment, bit stream decoder stage 320 accesses the MPEG encoded data. The data bits are fetched from external memory 310 to the bit stream decoder function 322, where the MPEG data bits are decoded. In one embodiment, a data bus allows communication as required among the stages and functions of data-driven MPEG decoder architecture 300 and external memory 310. As understood by those skilled in the art, a "bus" may comprise a shared set of wires or electrical signal paths to which other elements connect. However, as also understood by those skilled in the art, required communication paths may also be provided by other structures, such as individual point-to-point connections from each element to a switch, dedicated connections for each for each pair of elements that communicate with each other, or any combination of dedicated and shared paths. Therefore, it should be appreciated that the term "bus" refers to any structure that provides the communication paths required by the methods and device described below.

The decoded MPEG data bits are pushed to two other stages: preprocess stage 330 and motion compensation stage 350, for further computation. In one embodiment, preprocess 330 stage comprises of five functions: DC scalar calculation function 332 for determining the discrete transform value; predict direction function 334 for determining the prediction direction; AC/DC prediction function 336 for calculating the predicted AC and DC values; de-quantization function 338 for reversing the quantization and calculating the result value; and Run Level Coding (RLC) and Inverse Scan (I-Scan) function 340 for decoding the RLC and reversing the scan process to lay out the correct order of values.

From preprocess stage 330, a decoded block matrix is pushed to inverse discrete cosine transform (IDCT) stage 360. IDCT stage 360 performs the IDCT function 362 of transforming the matrix from the frequency domain into the time domain. The decoded block matrix elements represent the correct color space values.

While bit stream decoder stage 320 sends data to preprocess stage 330, the decoded bit stream is also sent as motion vectors to motion compensation stage 350. At motion compensation function 352 of motion compensation stage 350, the previous frame data is retrieved from external memory 310 and processed into a block matrix for the next stage copy and transfer.

The final pipelined stage may be copy and transfer stage 370 that is implemented to receive the block matrices sent from motion compensation stage 350 and IDCT stage 360. At copy and retire function 372, the block matrices are combined if necessary, and the final decoded picture is written back to external memory 310 to complete the data flow that drives the functions implemented as pipelined stages to carry out the functions sequentially.

Figure 4:
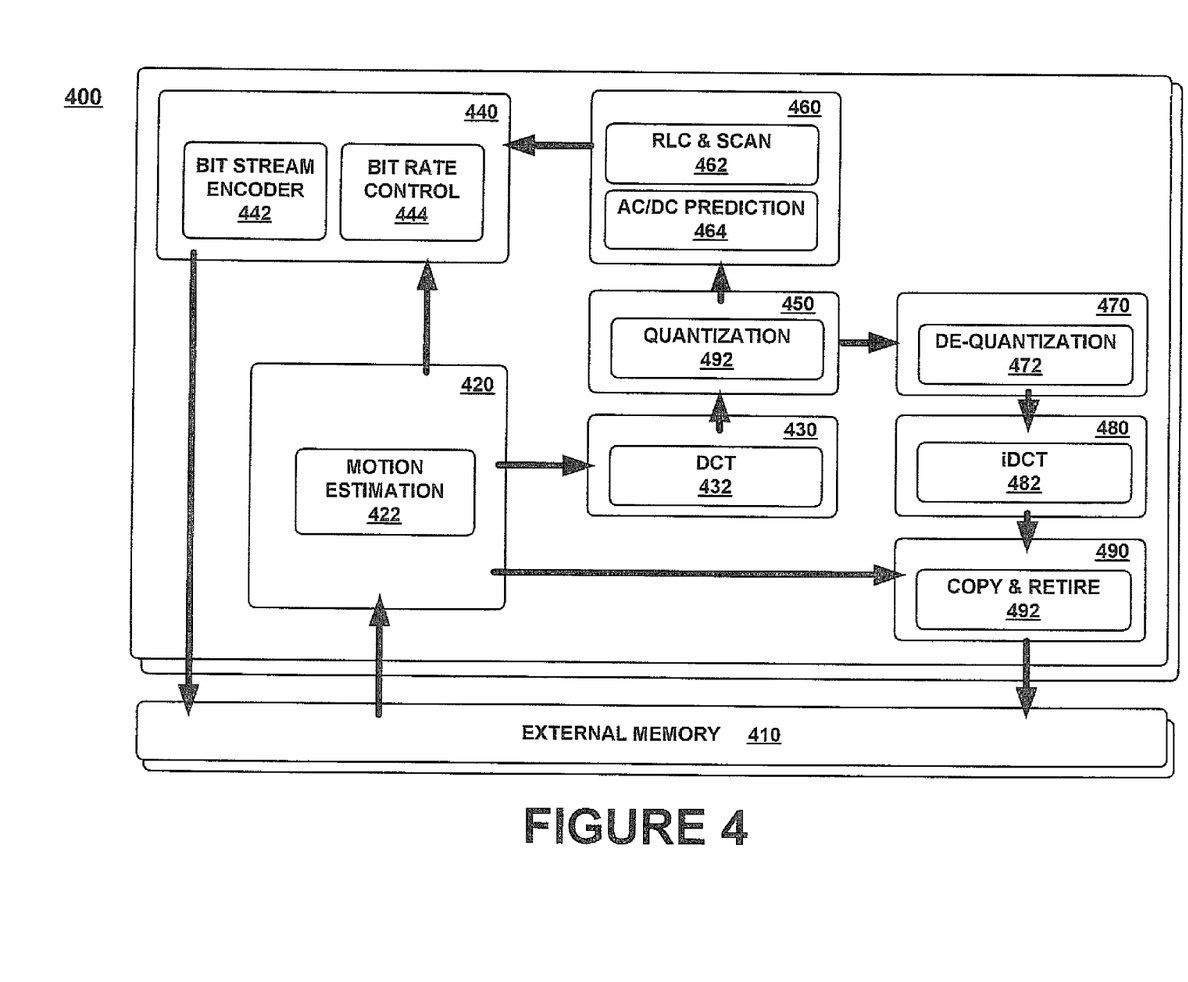
FIG. 4 shows a functional block diagram of a data-driven MPEG encoder architecture, in accordance with an embodiment of the present invention.

FIG. 4 shows a functional block diagram of a data-driven MPEG encoder architecture 400, in accordance with an embodiment of the present invention. In one embodiment, data-driven MPEG decoder architecture 400 is operable to encode MPEG-4 video image data. In one embodiment, the pipelined configuration is constructed by employing blocks to carry out a fixed logic that represent a pipeline stage. The smaller functional block inside each larger functional block represents the fixed function (e.g., pipelined stages implemented inside this larger functional block).

The data of the original picture is stored in external memory 410. In one embodiment, motion estimation stage 420 accesses the original picture data. Motion estimation function 422 is operable to retrieve the picture data, search for the optimal block matrix, and send the optimal block matrix to discrete cosine transform (DCT) stage 430. In one embodiment, motion estimation function is also operable to transmit the motion form vector of the picture data to bit stream encoding stage 440. Also, the pipelined process transfers the decoder motion compensation data to DCT stage 430 and to copy and retire stage 490 for decoded picture reconstruction.

DCT function 430 of DCT stage 432 is implemented to transform the matrix from time domain to frequency domain upon receiving the data from motion estimation stage 420. The result is transmitted to quantization stage 450. Quantization function 452 of quantization stage 450 is operable to calculate and quantize the values of the received data. The quantized data is then forwarded to inverse preprocess stage 460 and to de-quantization stage 470. De-quantization function 472, IDCT function 482, and copy and retire function 492 operate in a similar manner as de-quantization function 338, IDCT function 362, and copy and retire function 372 of FIG. 3, respectively, for a MPEG-4 decoder. The re-constructed picture may be saved back to external memory 410 for future use to complete the data flow and the data driven pipelined stages to perform the encoder functions in a sequential pipelined fashion.

Inverse preprocess stage 460 includes AC/DC prediction function 464 and RLC and scan stage 462. The quantized block matrix from quantization stage 450 is combined with AC/DC predictions and scanned to find all the RLC. The RLC is then pushed to bit stream encoding stage 440. Bit stream encoding stage 440 gathers all the information about the picture including RLC and motion vectors from inverse preprocess stage 460 and motion estimation stage 420. Bit stream encoder function 442 is performed to encode the final bit stream of MPEG and store back to external memory 410 to complete the data flow. Bit stream encoding stage 440 is also implemented with bit rate control function 444 to prepare the compression ratio of next frame of the video.

Figure 5:
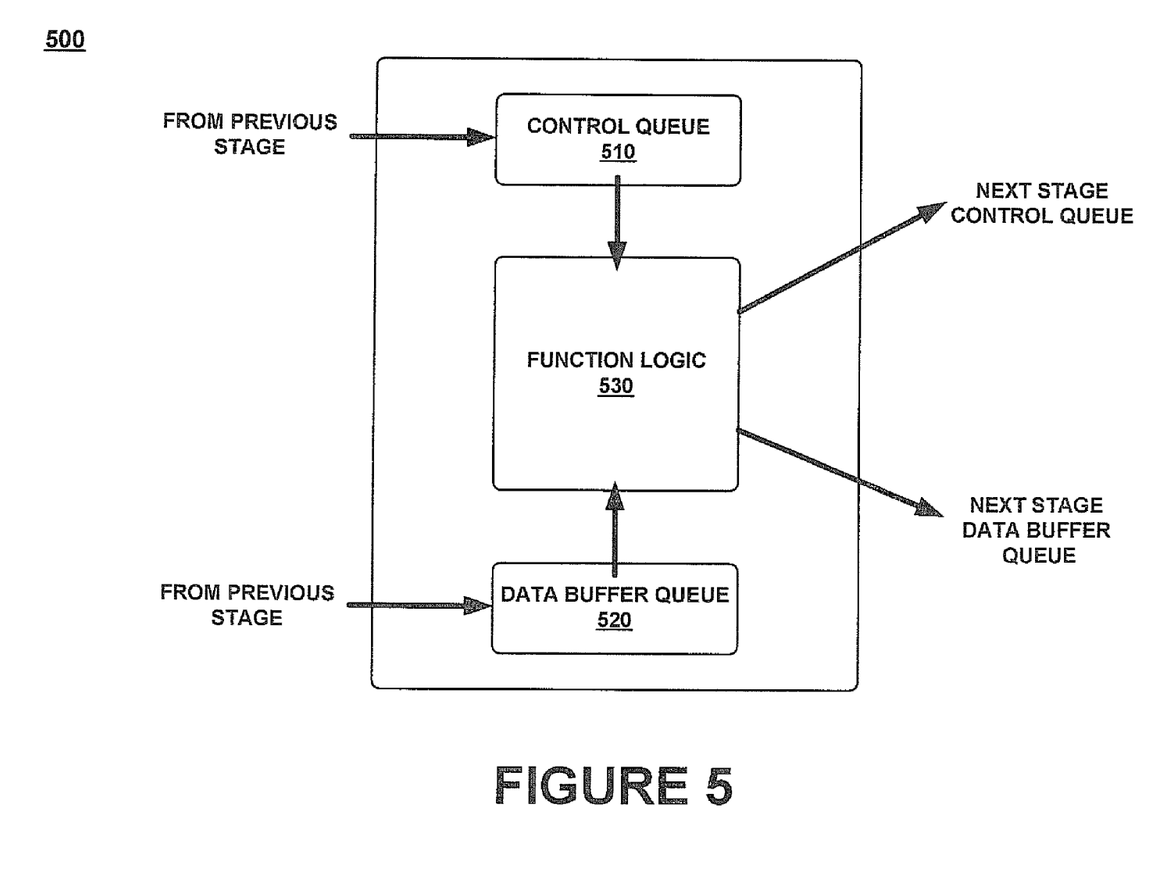
FIG. 5 is a functional block diagram for showing a pipelined fixed function, in accordance with an embodiment of the present invention.

FIG. 5 is a functional block diagram for showing a pipelined fixed function 500, in accordance with an embodiment of the present invention. In one embodiment, the stage blocks as shown in FIGS. 2, 3, and 4 include functional elements shown in pipelined fixed function 500 of FIG. 5. In one embodiment, the function logic is a fixed function circuit (e.g. IDCT function 362 of FIG. 3). Each function requires two inputs from previous stage, control input and data input. A function block includes at least one control queue 510 for queuing control inputs and at least one data buffer queue 520 for queuing data input. When control queue 510 has a command, function logic 530 starts to process the data from data queue 520. At the completion of functional performance, the functional stage stores the result to data queue 520 provided in a next stage. Meanwhile a command is sent to the control queue 510 of a next functional stage to initiate a functional performance designated for the next functional stage.

Figure 6:
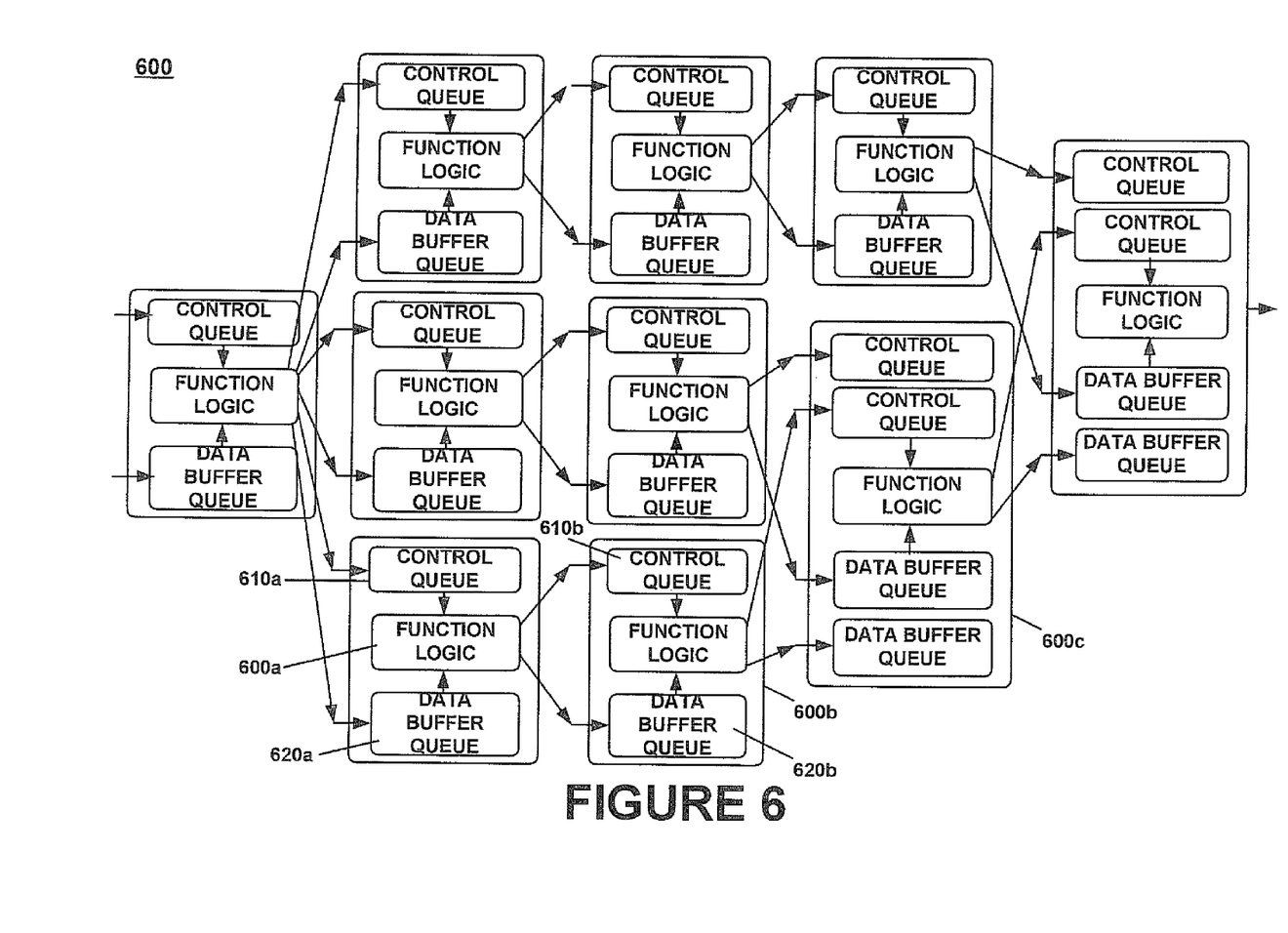
FIG. 6 is a functional block diagram showing a general pipelined architecture of a system implemented with pipelined fixed functions, in accordance with an embodiment of the present invention.

FIG. 6 is a functional block diagram showing a general pipelined architecture 600 of a system implemented with pipelined fixed functions, in accordance with an embodiment of the present invention. In one embodiment, pipelined architecture 600 is a data driven processing system that is configured by sequentially connecting a plurality of fixed function blocks (e.g., pipelined fixed function 500 of FIG. 5). The configuration as shown can be flexibly and effectively implemented in many different data processing systems to simplify system configuration, to lower the implementation cost and to minimize the complicated control and synchronization problems often encountered in the conventional central control processing systems.

The encoding and decoding systems as detailed in the described embodiments are divided into blocks of pipeline stages. Each block automatically synchronizes passing and buffering of data, and the system is completely data driven. There is no need for a central processor to control the sequence and data. Thus, the streamlined design provides a very efficient and high performance engine.

In one embodiment, pipeline stages are partitioned to follow the logic sequence in an MPEG encoding/decoding process. A stage of the pipeline is programmed to look at the control queue. For example, with reference to FIG. 6, if there is a request for data computation received at control queue 610a, fixed function 600a starts to process the data in data buffer queue 620a. When fixed function 600a finishes the data computation, the data is stored in data buffer queue 620b of fixed function 600b (e.g., the next stage). At the same time, fixed function 600a transmits the sequence information into control queue 610b of fixed function 600b.

In one embodiment, the data buffer queues and control queues as shown in FIGS. 5 and 6 are implemented using a dual buffer scheme (ping-pong buffer), one for current process and one for previous stage to use. The advantage of using dual buffer is to ensure the process can continue without being stalled by next stage.

Various embodiments of the present invention, a device and method for encoding and decoding video image data, are described. In one embodiment, the present invention includes a plurality of fixed-function data processors interconnected with a least one pipelined data transmission line wherein each of the fixed-function processors perform a predefined encoding/decoding function upon receiving a set of predefined data from the transmission line. In one embodiment, the plurality of fixed-function data processors includes a data buffer queue for receiving a set of predefined data from the transmission line. In another embodiment, the plurality of fixed-function data processors includes a control queue for initiating a performance of the predefined encoding/decoding function upon receiving a set of predefined data from the transmission line.

In another embodiment, the present invention provides a method for encoding and/or decoding a video image. The method includes sequentially pipelining a set of data via a data transmission line connected between a plurality of fixed-function data processors for sequentially performing a predefined encoding/decoding function upon receiving the set of data from the data transmission line.

Various embodiments of the invention, a method and device for encoding and decoding video image data, are thus described. While the present invention has been described in particular embodiments, it should be appreciated that the invention should not be construed as limited by such embodiments, but rather construed according to the below claims.

What is claimed is:

1. A video image data encoding/decoding device comprising:
   a plurality of fixed-function data processors interconnected with at least one pipelined data transmission line wherein each of said plurality of fixed-function data processors performs a predefined encoding/decoding function upon receiving a set of predefined data from another of said plurality of fixed-function data processors,
   wherein said plurality of fixed-function data processors are synchronized on data without a central controller,
   wherein each of said plurality of fixed-function data processors is data driven, and each of said plurality of fixed-function data processors comprises dedicated logic that operates independently from the remaining said plurality of fixed-function data processors, and each of said plurality of fixed-function data processors comprises a first queue to queue a set of predefined data and a second queue to queue a set of predefined control data, said set of predefined data and set of predefined control data are received from a previous fixed-function data processor of said plurality of fixed-function data processors, and each of said plurality of fixed-function data processors is operable to simultaneously store a set of predefined data to a first queue of a subsequent fixed-function data processor of said plurality of fixed-function data processors and to send a set of predefined control data to a second queue of said subsequent fixed-function data processor,
   wherein said first queue comprises a ping-gong buffer and said second queue comprises a ping-pong buffer.

2. The video image data encoding/decoding device of claim 1 wherein said first queue is operable for receiving a set of predefined data from said transmission line.

3. The video image data encoding/decoding device of claim 1 wherein said second queue is operable for initiating a performance of said predefined encoding/decoding function upon receiving a set of predefined control data from said transmission line.

4. The video image data encoding/decoding device of claim 1 wherein said first queue is operable for receiving a set of predefined data from said transmission line and said second queue is operable for initiating a performance of said predefined encoding/decoding function upon receiving a set of predefined control data.

5. The video image data encoding/decoding device of claim 1 wherein at least one of said plurality of fixed-function data processors comprises a bit-stream decoder.

6. The video image data encoding/decoding device of claim 5 wherein at least one of said plurality of fixed-function data processors comprises a motion compensation processor.

7. The video image data encoding/decoding device of claim 1 wherein at least one of said plurality of fixed-function data processors comprises a discrete cosine transformation (DCT) logic processor.

8. The video image data encoding/decoding device of claim 1 wherein at least one of said plurality of fixed-function data processors comprises an inverse discrete cosine transformation (IDCT) logic processor.

9. The video image data encoding/decoding device of claim 1 wherein at least one of said plurality of fixed-function data processors comprises a direction prediction processor.

10. The video image data encoding/decoding device of claim 1 wherein at least one of said plurality of fixed-function data processors comprises a de-quantization processor.

11. The video image data encoding/decoding device of claim 1 wherein at least one of said plurality of fixed-function data processors comprises an AC/DC prediction processor.

12. The video image data encoding/decoding device of claim 1 wherein at least one of said plurality of fixed-function data processors comprises a Run Level Coding (RLC) and Inverse Scan (I-Scan) logic processor.

13. The video image data encoding/decoding device of claim 1 wherein at least one of said plurality of fixed-function data processors comprises a copy and retire processor operable to combine data block matrices.

14. The video image data encoding/decoding device of claim 1 further comprising a data bus for transmitting data between said video image data encoding/decoding device and an external memory.

15. The video image data encoding/decoding device of claim 1, wherein at least one of said plurality of fixed-function data processors is powered down.

16. The video image data encoding/decoding device of claim 1, wherein at least one of said plurality of fixed-function data processors comprises a bit stream encoder processor.

17. The video image data encoding/decoding device of claim 1, wherein each of said plurality of fixed-function data processors is operable to automatically synchronize passing and buffering of data.

18. The video image data encoding/decoding device of claim 1, wherein a pipeline architecture comprises said plurality of fixed-function data processors.

19. A method for encoding/decoding video image data, said method comprising:
   receiving a first set of predefined image data at a first data driven processor for performing a first predefined encoding/decoding function, wherein said set of predefined image data is queued by a first queue of said first data driven processor and wherein a first set of predefined control data associated with said first set of predefined data is queued by a second queue of said first data driven processor;
   performing said first predefined encoding/decoding function via said first data driven processor; and
   transmitting via said first data driven processor a second set of predefined image data to at least a second data driven processor for performing a second predefined encoding/decoding function, said second set of predefined image data is queued by a first queue of said second data driven processor, said first data driven processor and said second data driven processor are synchronized on data without a central controller, and said first data driven processor is operable to simultaneously perform said transmitting and send a second set of predefined control data to said second data driven processor, wherein said second set of predefined control data is queued by a second queue of said second data driven processor;

wherein said first queue of said first data driven processor comprises a ping-pong buffer, said second queue of said first data driven processor comprises a ping-pong buffer, said first queue of said second data driven processor comprises a ping-pong buffer, and said second queue of said second data driven processor comprises a ping-pong buffer.

20. The method as recited in claim 19 wherein said second queue of said first data driven processor is operable for initiating said performing upon receiving said first set of predefined control data.

21. The method as recited in claim 20 further comprising:
performing said second predefined encoding/decoding function via said second data driven processor, said second queue of said second data driven processor is operable for initiating said performing said second predefined encoding/decoding function upon receiving said second set of predefined control data.

22. A data encoding/decoding system comprising:
a first data driven processor operable to receive a first set of predefined image data and a first set of predefined control data from a previous data driven processor, said first data driven processor is operable to perform a first predefined encoding/decoding function, said first set of predefined image data is queued by a data buffer queue of said first data driven processor and a first set of predefined control data associated with said first set of predefined image data is queued by a control queue of said first data driven processor;

a second data driven processor connected to said first data driven processor, said second data driven processor comprises a data buffer queue and a control queue; and wherein said first data driven processor is operable to simultaneously store a second set of predefined image data to said data buffer queue of said second data driven processor and send a second set of predefined control data to said control queue of said second data driven processor that is associated with said second set of predefined image data, said second data driven processor is operable to perform a second predefined encoding/decoding function, said first data driven processor and said second data driven processor are synchronized on data without a central controller, wherein said data buffer queue of said first data driven processor comprises a ping-pong buffer, said control queue of said first data driven processor comprises a ping-pong buffer, said data buffer queue of said second data driven processor comprises a ping-pong buffer, and said control queue of said second data driven processor comprises a ping-pong buffer.

23. The system as recited in claim 22 wherein each of said first and second data driven processors is operable to synchronize passing and buffering of data automatically.

24. The system as recited in claim 22 further comprising a third data driven processor connected to said second data driven processor, said third data driven processor comprises a data buffer queue and a control queue, said data buffer of said third data driven processor comprises a ping-pong buffer and said control queue of said third data driven processor comprises a ping-gong buffer.

* * * * *